United States Patent
Zhao et al.

(10) Patent No.: US 10,620,660 B2
(45) Date of Patent: Apr. 14, 2020

(54) EFFICIENT TIMESTAMP SOLUTION FOR ANALYZING CONCURRENT SOFTWARE SYSTEMS

(71) Applicant: ORACLE INTERNATIONAL CORPORATION, Redwood Shores, CA (US)

(72) Inventors: Yang Zhao, St. Lucia (AU); Nicholas John Allen, Westlake (AU); Cristina Nicole Cifuentes, Forest Lake (AU); Nathan Robert Albert Keynes, Kuraby (AU)

(73) Assignee: Oracle International Corporation, Redwood Shores, CA (US)

( * ) Notice: Subject to any disclaimer, the term of this patent is extended or adjusted under 35 U.S.C. 154(b) by 277 days.

(21) Appl. No.: 15/935,190

(22) Filed: Mar. 26, 2018

(65) Prior Publication Data
US 2019/0294205 A1   Sep. 26, 2019

(51) Int. Cl.
*G06F 1/12* (2006.01)
*G06F 13/42* (2006.01)

(52) U.S. Cl.
CPC .................... *G06F 1/12* (2013.01)

(58) Field of Classification Search
None
See application file for complete search history.

(56) References Cited

U.S. PATENT DOCUMENTS

| | | | | |
|---|---|---|---|---|
| 6,078,930 A | * | 6/2000 | Lee | G06F 11/1415 |
| 2015/0092796 A1 | * | 4/2015 | Aweya | H04J 3/0667 |
| | | | | 370/516 |
| 2015/0156262 A1 | * | 6/2015 | Alves | H04L 69/28 |
| | | | | 709/201 |

OTHER PUBLICATIONS

Jhala, R. et al., "Software Model Checking". ACM Computing Surveys, vol. 41, Issue 4, Article No. 21 , Oct. 2009 (57 pages).
Peled, Doran, "All from one, One for All: On Model Checking Using Representatives"; Proceedings of the 5th International Conference on Computer Aided Verification (CAV), pp. 409-423, Elounda, Greece, Jun. 28-Jul. 1, 1993 (16 pages).
Godefroid, P. Partial-Order Methods for the Verification of Concurrent Systems—an Approach to the State-Explosion Problem (PhD Thesis) University of Liege, 1994 (136 pages).

(Continued)

*Primary Examiner* — Nitin C Patel
(74) *Attorney, Agent, or Firm* — Ferguson Braswell Fraser Kubasta PC (57) ABSTRACT

A method may include obtaining a concurrent application including processes, each including operations, and obtaining an initial hybrid timestamp for an initial operation of a process. The initial hybrid timestamp may include a vector list timestamp including vector clocks, each including a clock value for each of the processes. The method may further include determining a synchronization category for a next operation of the process, and in response to the synchronization category indicating that the next operation does not require inter-process synchronization, generating a next hybrid timestamp for the next operation. The next hybrid timestamp may include a differential timestamp relative to the initial hybrid timestamp.

20 Claims, 6 Drawing Sheets

(56) References Cited

OTHER PUBLICATIONS

Flanagan, C. et al., "Dynamic Partial-Order Reduction for Model Checking Software", Proceedings of the 32nd ACM Sigplan-Sigact Symposium on Principles of Programming Languages (POPL), pp. 110-121, Jan. 2005 (12 pages).
Lamport, L. "Time, Clocks, and the Ordering of Events in a Distributed System"; Communications of the ACM, vol. 21, Issue 7, pp. 558-565, Jul. 1978 (8 pages).
Fidge, C. J. "Timestamps in Message-Passing Systems that Preserve the Partial Ordering"., Proceedings of the 11th Australian Computer Science Conference (ACSC) pp. 56-66, Feb. 1988 (11 pages).
Mattern, F. "Virtual Time and Global States of Distributed Systems"; Proceedings of the International Workshop on Parallel and Distributed Algorithms, pp. 215-226, France, Oct. 1988 (15 pages).
Raynal M. et al., "Logical Time: Capturing Causality in Distributed Systems", Published in: Computer, vol. 29, Issue 2, pp. 49-56, Feb. 1996 (8 pages).
Holzmann, G. J., "State Compression in SPIN: Recursive Indexing and Compression Training Runs"; Proceedings of the 3rd International SPIN Workshop, 1997 (10 pages).
Van Der Vegt, S. et al., "A Parallel Compact Hash Table" Proceedings of Doctoral Workshop on Mathematical and Engineering Methods in Computer Science (MEMICS) pp. 191-204 [LNCS vol. 7119] Oct. 7, 2011(14 pages).
Yang, Y. et al., "Distributed Dynamic Partial Order Reduction Based Verification of Threaded Software"; Proceedings of the International SPIN Workshop on Model Checking of Software, 2007, LNCS vol. 4595 pp. 58-75, 2007 (18 pages).

\* cited by examiner

EFFICIENT TIMESTAMP SOLUTION FOR ANALYZING CONCURRENT SOFTWARE SYSTEMS

BACKGROUND

Concurrency with synchronization introduces new challenges to verification and testing, because some defects may only occur under specific interleaving of execution flows. This nondeterministic feature is due to the variety of possible execution orders in which tasks from different parallel processes may be scheduled. Model checking is a formal verification technique performing exhaustive state-space exploration. Given a system model, model checking can automatically check whether the model satisfies certain properties. In order to avoid favoring any particular execution order, the model checker interleaves operations in all possible ways, which may result in searching an exponentially large space of state transitions.

Dynamic Partial Order Reduction (DPOR) can reduce the size of state space by removing unnecessary state transitions. The core part of DPOR is determining independent concurrent operations, which requires building a happens-before relation based on a timestamp calculation for each operation. Most timestamp solutions require massive memory space at runtime. Some timestamp compression techniques aim to reduce the communication cost among processes in low-level message-passing systems, but these techniques cannot be directly applied to high-level synchronizations, such as Remote Procedure Call (RPC) and barriers. Many model checking tools also include internal state space compression capabilities. However, these compression capabilities barely consider the characteristics of timestamp structures and thus the compressed state cannot be easily reversed to determine causality relations among concurrent operations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining a concurrent application including processes, each including operations, and obtaining an initial hybrid timestamp for an initial operation of a process. The initial hybrid timestamp includes a vector list timestamp including vector clocks, each including a clock value for each of the processes. The method further includes determining a synchronization category for a next operation of the process, and in response to the synchronization category indicating that the next operation does not require inter-process synchronization, generating a next hybrid timestamp for the next operation. The next hybrid timestamp includes a differential timestamp relative to the initial hybrid timestamp.

In general, in one aspect, one or more embodiments relate to a system including a memory, coupled to a processor, including a repository including a concurrent application including processes, each including operations, and an initial hybrid timestamp for an initial operation of a process. The initial hybrid timestamp includes a vector list timestamp including vector clocks, each including a clock value for each of the processes. The repository further includes a next hybrid timestamp for a next operation of the process. The next hybrid timestamp includes a differential timestamp relative to the initial hybrid timestamp. The system further includes a timestamp generator executing on the processor configured to determine a synchronization category for the next operation, and in response to the synchronization category indicating that the next operation does not require inter-process synchronization, generate the next hybrid timestamp.

In general, in one aspect, one or more embodiments relate to relate to a non-transitory computer readable medium including instructions that, when executed by a processor, perform obtaining a concurrent application including processes, each including operations, and obtaining an initial hybrid timestamp for an initial operation of a process. The initial hybrid timestamp includes a vector list timestamp including vector clocks, each including a clock value for each of the processes. The method further includes determining a synchronization category for a next operation of the process, and in response to the synchronization category indicating that the next operation does not require inter-process synchronization, generating a next hybrid timestamp for the next operation. The next hybrid timestamp includes a differential timestamp relative to the initial hybrid timestamp.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a memory-efficient method and system for generating timestamps. In one or more embodiments, hybrid timestamps are generated for operations executed by processes in a concurrent application. Each hybrid timestamp may be either a vector list timestamp or a differential timestamp, depending on whether the execution of the corresponding operation requires inter-process synchronization. Inter-process synchronization may be required, for example, when operations generate remote procedure calls (RPCs), barrier waits, process forks, context switches, etc.

A vector list timestamp may include vector clocks each including a clock value for each process of the concurrent application. A vector clock may be thought of as a snapshot of the "logical time" in each process of the concurrent application. For example, the clock value for a process may indicate that a number of "ticks" has elapsed, where each "tick" may correspond to an operation performed by the process.

A vector clock may provide an empirical basis for inferring a happens-before relation between operations. For example, if, in each interleaving of the execution of the concurrent application, each clock value of the vector clock for operation A is less than the corresponding clock value of the vector clock for operation B, then it may be inferred that operation A happens before operation B.

In one or more embodiments, each process has its own vector clock that represents that process' local view of the logical time for each process of the concurrent application. In contrast, in one or more embodiments, a differential timestamp represents an adjustment to a clock value for a process of the concurrent application. That is, instead of generating an entire new vector list timestamp, a differential timestamp may be generated to represent the adjustment to the clock value of the process, relative to a previous vector list timestamp. The differential timestamp may be viewed as an optimized, compact representation of an adjustment to a hybrid timestamp.

Since many operations in a concurrent application are not causally related to operations in other processes, and therefore do not require inter-process synchronization, a differential timestamp may often suffice. In one or more embodiments, recovering the full vector list timestamp from a series of differential timestamps is efficient, since each differential timestamp is typically of constant size (e.g., the differential timestamp typically includes a single differential clock value for a single process), and there are likely to be only a few differential timestamps to merge into to the previous vector list timestamp. Therefore, using hybrid timestamps may significantly reduce the memory footprint due to timestamps.

Figure 1A:
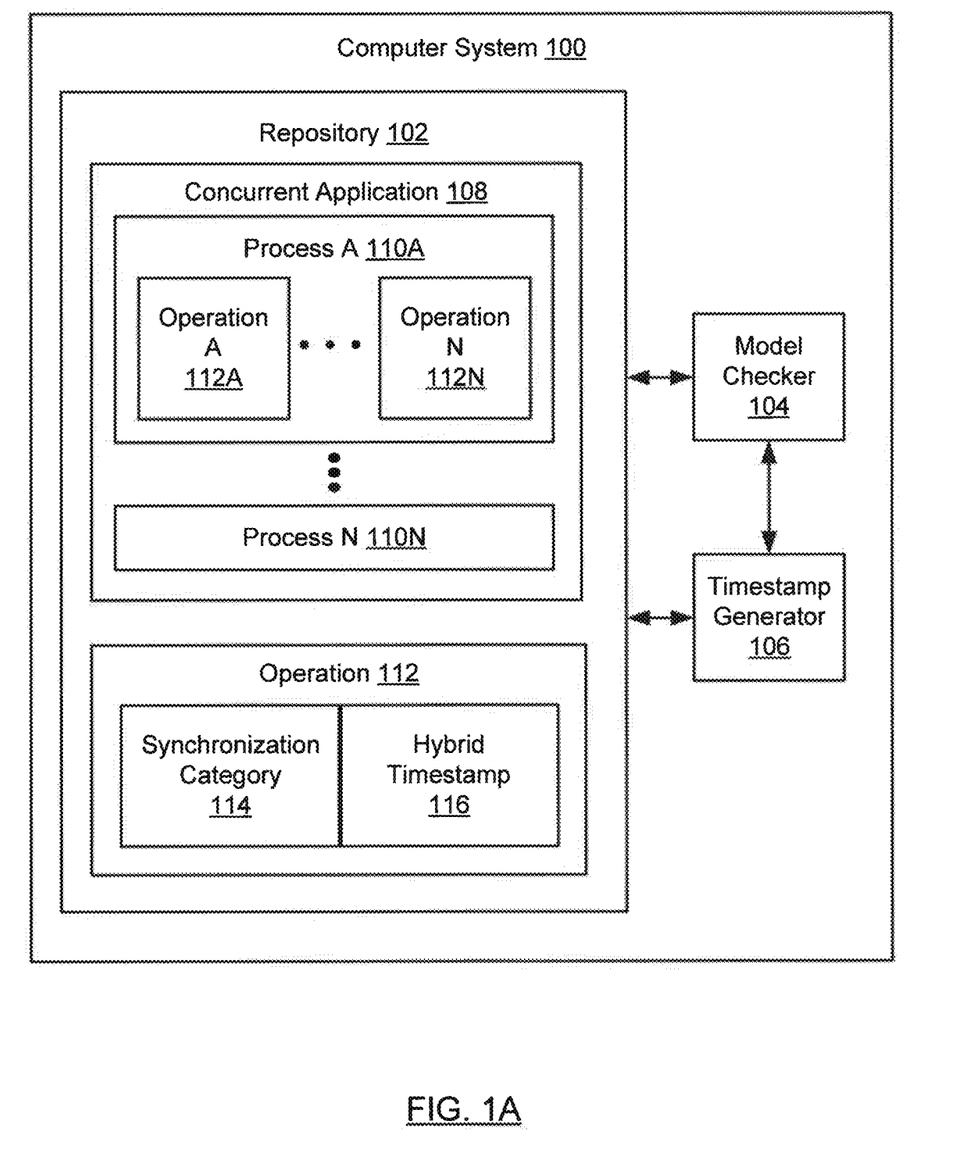
FIG. 1A and FIG. 1B show systems in accordance with one or more embodiments of the invention.

FIG. 1A shows a computer system (100) in accordance with one or more embodiments of the invention. As shown in FIG. 1A, the system (100) includes a repository (102), a model checker (104), and a timestamp generator (106). In one or more embodiments, the computer system (100) takes the form of the computing system (500) described with respect to FIG. 5A and the accompanying description below, or takes the form of the client device (526) described with respect to FIG. 5B.

In one or more embodiments, the repository (102) may be any type of storage unit and/or device (e.g., a file system, database, collection of tables, or any other storage mechanism) for storing data. For example, the repository (102) may be stored in non-persistent storage (504) or persistent storage (506), as described below with respect to FIG. 5A. Further, the repository (102) may include multiple different storage units and/or devices. The multiple different storage units and/or devices may or may not be of the same type or located at the same physical site.

In one or more embodiments, the repository (102) includes a concurrent application (108). In one or more embodiments, the concurrent application (108) is a collection of source code including various software components. That is, the concurrent application (108) may be a collection of computer instructions written in a human-readable programming language. The concurrent application (108) may be transformed by a compiler into binary machine code.

In one or more embodiments, the concurrent application (108) includes processes (110A, 110N). In one or more embodiments, a process (110A) is a logically separate (e.g., isolated) instruction execution stream in which operations (112A, 112N) may be executed by one or more processors (e.g., computer processor(s) (502) of FIG. 5A). Examples of operations (112A, 112N) may include: a task or transaction executed by a process (110A), and an event caused by a process (110A). In one or more embodiments, processes (110A, 110N) are created (e.g., via a process fork) and/or destroyed during the execution of the concurrent application (108). A concurrent application (108) may be divided into multiple processes (110A, 110N) in order to partition a complex operation (112A) into sub-operations. For example, a QuickSort algorithm may be divided into operations (112A, 112N) each sorting a portion of a large array.

Continuing with FIG. 1A, in one or more embodiments, an operation (112) includes a synchronization category (114) and a hybrid timestamp (116). A synchronization category (114) may indicate whether the execution of the corresponding operation (112) requires inter-process synchronization with one or more other operations (112A, 112N) in one or more other processes (110A, 110N). For example, a synchronization category (114) of "independent" may indicate that the operation (112) may be performed without coordinating with any other process. Alternatively, the synchronization category (114) may indicate that executing the operation (112) requires synchronization with one or more other operations in one or more processes (110A, 110N). For example, the synchronization category (114) may be "process fork" (e.g., the operation (112) creates a new process (110A) that performs one or more operations (112A, 112N)), "remote procedure call (RPC)" (e.g., the operation (112) is performed inside a call to a remote process (110A)), "barrier wait completion" (e.g., the operation (112) requires waiting until the execution of one or more processes (110A, 110N) reaches a synchronization barrier), "context switch" (e.g., execution is transferred from one process to another process), etc.

Figure 1B:
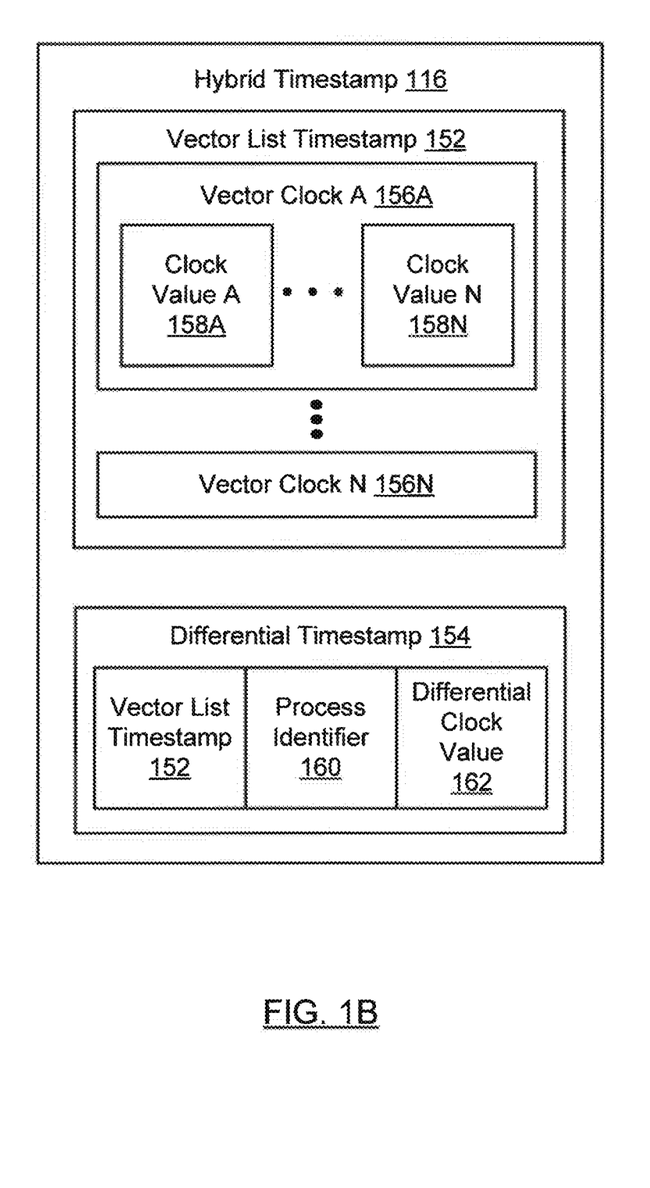

In one or more embodiments, a hybrid timestamp (116) represents the "logical time" associated with the operation (112), as described below. In one or more embodiments, a hybrid timestamp (116) represents the logical time associated with an event caused by executing the operation (112). Turning to FIG. 1B, in one or more embodiments, a hybrid timestamp (116) may be a vector list timestamp (152) or a differential timestamp (154). A vector list timestamp (152) may include a list of vector clocks (156A, 156N). In one or more embodiments, a vector clock (156A) includes a clock value (158A, 158N) for each process (110A, 110N) of the concurrent application (108). A vector clock (156A) may be thought of as a snapshot that measures the passage of time in each process (110A, 110N) of the concurrent application (108). In other words, the vector clock (156A) may represent a "vector" of clock values (158A, 158N) for each process (110A, 100N) of the concurrent application (108).

In one or more embodiments, the clock values (158A, 158N) of the vector clock (156A) may indicate a "logical time" associated with each process (110A, 110N). For example, the clock value (158A) for a process (110A) may indicate that a number of "ticks" has elapsed (e.g., where each "tick" may correspond to an operation (112A, 112N) performed by the process (110A)). The clock value (158A) may be interpreted relative to a reference vector list timestamp. An example of a reference vector list timestamp may be a vector list timestamp (152) in which all clock values (158A, 158N) are set to zero. Alternatively, a reference vector list timestamp may be a vector list timestamp (152) that represents a synchronization point for multiple processes (110A, 110N) (e.g., after a barrier wait completion). In addition, a reference vector list timestamp may be any previous vector list timestamp (152).

Thus, each process (110A, 110N) may have its own vector clock (156A, 156N) that represents that process' (110A, 110N) local view of the logical time for each process (110A, 110N) of the concurrent application (108). In contrast, the full list of vector clocks (156A, 156N) in the vector list timestamp (112A, 112N) may represent a global view of logical time for the concurrent application (108), where the global view includes the vector clocks (156A, 156N) for each process (110A, 110N). In other words, the global view of logical time for the concurrent application (108) may be thought of as the aggregation of the local process-specific views of logical time for the processes (110A, 110N) of the concurrent application (108).

A vector clock (156A) may be thought of as a mechanism to capture a happens-before (e.g., causal) relation between operations (112A, 112N). That is, vector clocks (156A, 156N) associated with executed operations (112A, 112N) may provide an empirical basis for inferring a happens-before relation between operations (112A, 112N). For example, if, in each interleaving of the execution of the concurrent application (108), each clock value (158A, 158N) of the vector clock for operation A is less than each clock value (158A, 158N) of the vector clock for operation B, then it may be inferred that operation A happens before operation B. Alternatively, if two operations (112A, 112N) are commutative, such that their execution order is different in different interleavings (e.g., in one interleaving one operation is executed first and in another interleaving the other operation is executed first), then it may be inferred that the two operations (112A, 112N) are concurrent (e.g., the execution of each operation may proceed independently of the execution of the other operation).

Continuing with FIG. 1B, in one or more embodiments, a differential timestamp (154) includes a reference to a vector list timestamp (152), a process identifier (160), and a differential clock value (162). In one or more embodiments, a differential timestamp (154) represents, in the context of the referenced vector list timestamp (152), an adjustment to a clock value (158A) for the process (110A) corresponding to the process identifier (160). The adjustment may be represented by the differential clock value (162). In one or more embodiments, a series of differential timestamps (154) represents a series of adjustments to the clock value (158A) associated with a process (110A). In one or more embodiments, each adjustment may represent an incremental adjustment to the clock value (158A). In one or more embodiments, each adjustment may represent a cumulative adjustment that incorporates a series of adjustments to the clock value (158A).

Returning to FIG. 1A, the model checker (104) may be implemented in hardware (e.g., circuitry), software, or any combination thereof. In one or more embodiments, the model checker (104) includes functionality to analyze the concurrent application (108) (e.g., using Dynamic Partial Order Reduction (DPOR)) to verify a property of the concurrent application (108). The timestamp generator (106) may be implemented in hardware (e.g., circuitry), software, or any combination thereof. In one or more embodiments, the timestamp generator (106) includes functionality to generate a hybrid timestamp (116) for an operation (112A) performed by a process (110A). In one or more embodiments, the model checker (104) In one or more embodiments to determine whether an operation (112A, 112N) executed by a process (110A, 110N) happens before another operation (112A, 112N) executed by another process (110A, 110N).

While FIG. 1A and FIG. 1B show configurations of components, other configurations may be used without departing from the scope of the invention. For example, various components may be combined to create a single component. As another example, the functionality performed by a single component may be performed by two or more components.

Figure 2:
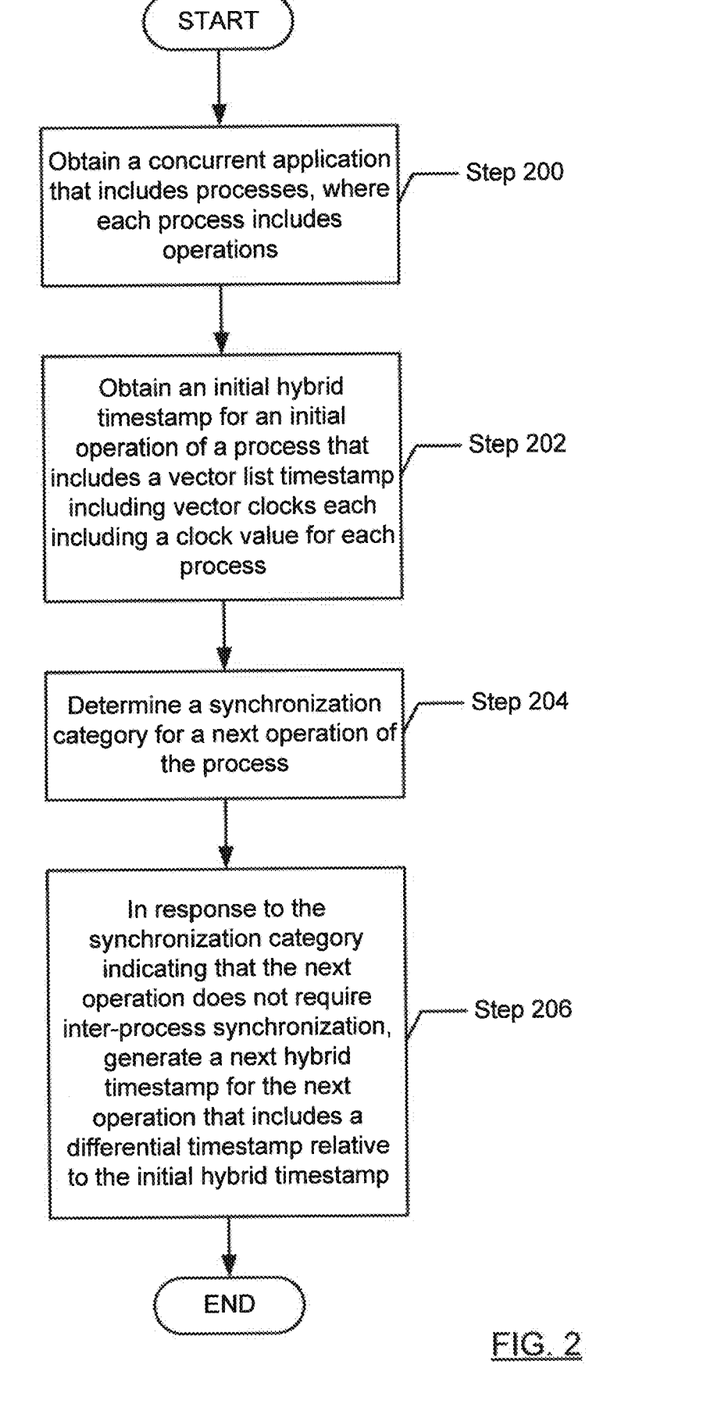
FIG. 2 and FIG. 3 show flowcharts in accordance with one or more embodiments of the invention.

FIG. 2 shows a flowchart in accordance with one or more embodiments of the invention. The flowchart depicts a process for generating a timestamp. One or more of the steps in FIG. 2 may be performed by the components (e.g., the model checker (104) or timestamp generator (106) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a concurrent application is obtained. In one or more embodiments, the concurrent application includes processes. A process may be a separate instruction execution stream in which operations may be executed by one or more processors. Examples of operations may include: a task or transaction executed by a process, and an event caused by a process. Processes may be created and/or destroyed during the execution of the concurrent application.

In Step 202, an initial hybrid timestamp for an initial operation of a process is obtained. The initial hybrid timestamp may be an initial vector list timestamp that includes vector clocks each including a clock value for each process of the concurrent application. A vector clock may be thought of as a snapshot that measures the passage of time in each process of the concurrent application.

The clock values of a vector clock may indicate a "logical time" associated with each process, so that each process may monitor the passage of time in every process of the concurrent application. For example, the clock value for a process may indicate that a number of "ticks" has elapsed, where each "tick" may correspond to an operation performed by the process. The clock value may be interpreted relative to a reference vector list timestamp (e.g., a vector list timestamp in which all clock values are set to zero). Alternatively, a reference vector list timestamp may be a vector list timestamp that represents a synchronization point for multiple processes.

Each process may have its own vector clock that represents that process' local view of the logical time for each process of the concurrent application. In contrast, the list of vector clocks in the vector list timestamp may represent a global view of logical time for the concurrent application, where the global view includes the vector clocks for each process.

A vector clock may provide an empirical basis for inferring a happens-before relation between operations. For example, if, in each interleaving of the execution of the concurrent application, each clock value of the vector clock for operation A is less than the corresponding clock value of the vector clock for operation B, then it may be inferred that operation A happens before operation B.

In Step 204, a synchronization category for a next operation of the process is determined. A synchronization category may indicate whether the execution of the corresponding operation requires inter-process synchronization. For example, a synchronization category of "independent" may indicate that the operation may be performed without coordination with an operation in a different process (i.e., a process other than the process whose initial hybrid timestamp was obtained in Step 202 above). Alternatively, the synchronization category (e.g., remote procedure call, barrier wait completion, process fork, etc.) may indicate that executing the corresponding operation requires synchronization with one or more other operations in one or more other processes. For example, inter-process synchronization may require adjustments to the clock values corresponding to multiple processes.

In Step 206, a next hybrid timestamp is generated for the next operation, in response to the synchronization category indicating that the next operation is not synchronized with any other process. The next hybrid timestamp may be a differential timestamp relative to the initial hybrid timestamp. In one or more embodiments, the differential timestamp includes a reference to a vector list timestamp, a process identifier, and a differential clock value. The differential timestamp may represent, in the context of the referenced vector list timestamp, an adjustment (i.e., represented by the differential clock value) to a clock value for the process corresponding to the process identifier. That is, instead of generating an entire new vector list timestamp to reflect an adjustment to the clock value associated with a process, only the adjustment to the clock value of the process is represented. In other words, the differential timestamp may be viewed as an optimized, compact representation of an adjustment to a hybrid timestamp. In one or more embodiments, a series of differential timestamps represents a series of adjustments to the clock value for a process.

Since most operations in a concurrent application are not causally related to operations in other processes, and therefore do not require inter-process synchronization, a differential timestamp that references a vector list timestamp may suffice for most operations. The size of a vector list timestamp may be proportional to the square of the number of processes in the concurrent application (e.g., $O(N^2)$ computational complexity, where N is the number of processes). In contrast, the size of a differential timestamp may be proportional to a constant (e.g., $O(1)$ computational complexity). Therefore, using hybrid timestamps may significantly reduce the memory footprint due to timestamps.

Experimental results comparing memory consumption using a hybrid timestamp solution vs. memory consumption using a vector list timestamp solution showed that the hybrid timestamp solution uses much less memory than the vector list timestamp solution. For example, during a model-checking analysis of a parallel QuickSort algorithm sorting 8192 elements with 32 processes, the hybrid timestamp solution used approximately 50 times less memory than the vector list timestamp solution. In addition, memory consumption using the hybrid timestamp solution is insensitive to the number of processes (i.e., memory consumption grows at a constant rate), in contrast to the exponential growth in memory consumption using the vector list timestamp solution.

Figure 3:
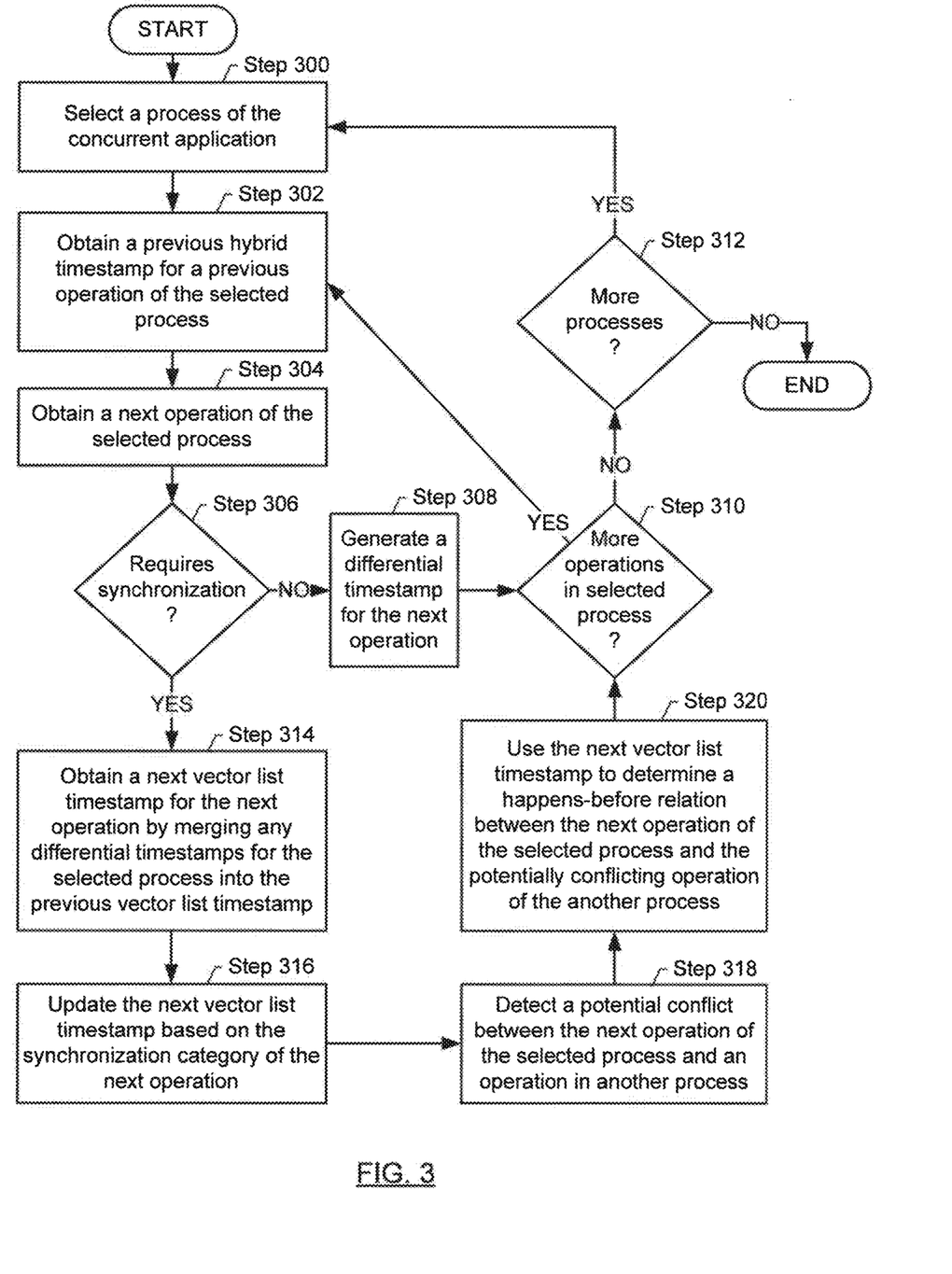

FIG. 3 shows a flowchart in accordance with one or more embodiments of the invention. The flowchart depicts a process for generating a timestamp. One or more of the steps in FIG. 3 may be performed by the components (e.g., the model checker (104) or timestamp generator (106) of the computer system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, a process of the concurrent application is selected (see description of Step 200 above).

In Step 302, a previous hybrid timestamp for a previous operation of the selected process is obtained. The previous hybrid timestamp may be a vector list timestamp (see description of Step 202 above) or a differential timestamp (see description of Step 206 above).

In Step 304, a next operation of the selected process is obtained. For example, the selected process may perform a collection (e.g., a sequence) of operations.

If, in Step 306, it is determined that the next operation requires synchronization with an operation in a different process (see description of Step 204 above), then Step 314 below is performed. Otherwise, if it is determined that the next operation does not require inter-process synchronization, then Step 308 below is performed.

In Step 308, a differential timestamp is generated for the next operation (see description of Step 206 above).

If, in Step 310, it is determined that there are additional operations to be performed by the selected process, then Step 302 above is again performed for another operation of the selected process (e.g., where the next operation becomes the "previous" operation).

If, in Step 312, it is determined that there are additional processes of the concurrent application to select, then Step 300 above is again performed for another process of the concurrent application. That is, the loop beginning with Step 300 may be performed again for other (e.g., currently active) processes of the concurrent application.

In Step 314, a next hybrid timestamp is generated for the next operation by merging any differential timestamps for the selected process that reference the previous vector list timestamp into to the previous vector list timestamp, to obtain a next vector list timestamp. Recall that each differential timestamp represents a compact, optimized (i.e., requiring reduced memory) representation of a vector list timestamp. That is, in Step 314, given that the next operation requires inter-process synchronization (e.g., as determined in Step 306 above), the full vector list timestamp implied by the differential timestamp(s) may be recovered (i.e., reconstructed) from the previous vector list timestamp, incorporating any differential timestamps that reference the previous vector list timestamp. Recovering the full vector list timestamp may be efficient, since each differential timestamp may be of constant size (e.g., the differential timestamp typically includes a single differential clock value for a single process), and there are likely to be only a few differential timestamps to incorporate into to the previous vector list timestamp.

If there are no differential timestamps that reference the previous vector list timestamp, then the next vector list timestamp may simply be a copy of the previous vector list timestamp.

In Step 316, the next vector list timestamp is updated based on the synchronization category of the next operation. In one or more embodiments, the next vector list timestamp may be updated by adjusting (e.g., incrementing) the clock value corresponding to the selected process in the vector clock corresponding to the selected process. In addition, the next vector list timestamp may be updated by adjusting the clock value(s) corresponding to one or more other processes that are synchronized to the selected process in the vector clock corresponding to the selected process (e.g., during a remote procedure call (RPC), or when a barrier wait has been completed).

In one or more embodiments, one or more other processes that are synchronized to the selected process may send a message to the selected process that includes an updated state of the vector clock from the perspective of the other process. If such a message is received, the vector clock corresponding to the selected process may be updated using the updated state of the vector clock included in the message.

In Step 318, a potential conflict between the next operation of the selected process and an operation in a different process is detected. In one or more embodiments, the potential conflict may be detected by the model-checker when analyzing the concurrent application. For example, the potential conflict may involve multiple processes of the concurrent application attempting to access the same memory location (e.g., where at least one process is attempting to write to the memory location). As another example, the potential conflict may involve multiple remote procedure calls to the same receiver process.

In Step 320, the next vector list timestamp is used to determine a happens-before relation between the next operation of the selected process and the operation in the different process. For example, the model-checker, when analyzing the concurrent application may need to determine whether the next operation of the selected process and the operation in the different process are independent (e.g., concurrent) or are constrained by a happens-before relation. As discussed earlier, vector clocks in a vector list timestamp may be used to determine whether a happens-before relation exists between two operations. For example, the model checker may execute different interleavings of the operations of the concurrent application, and examine the vector clocks corresponding to the operations. If one operation precedes the other operation in each interleaving, it may be inferred that a happens-before relation exists between the two operations. Alternatively, if one operation O precedes the other operation O' in some interleavings, but operation O follows the other operation O' in some other interleavings, then it may be inferred that no happens-before relation exists, and the operations may be concurrent.

Next, Step 310 above is performed to determine whether there are additional operations to be performed by the selected process.

Figure 4:
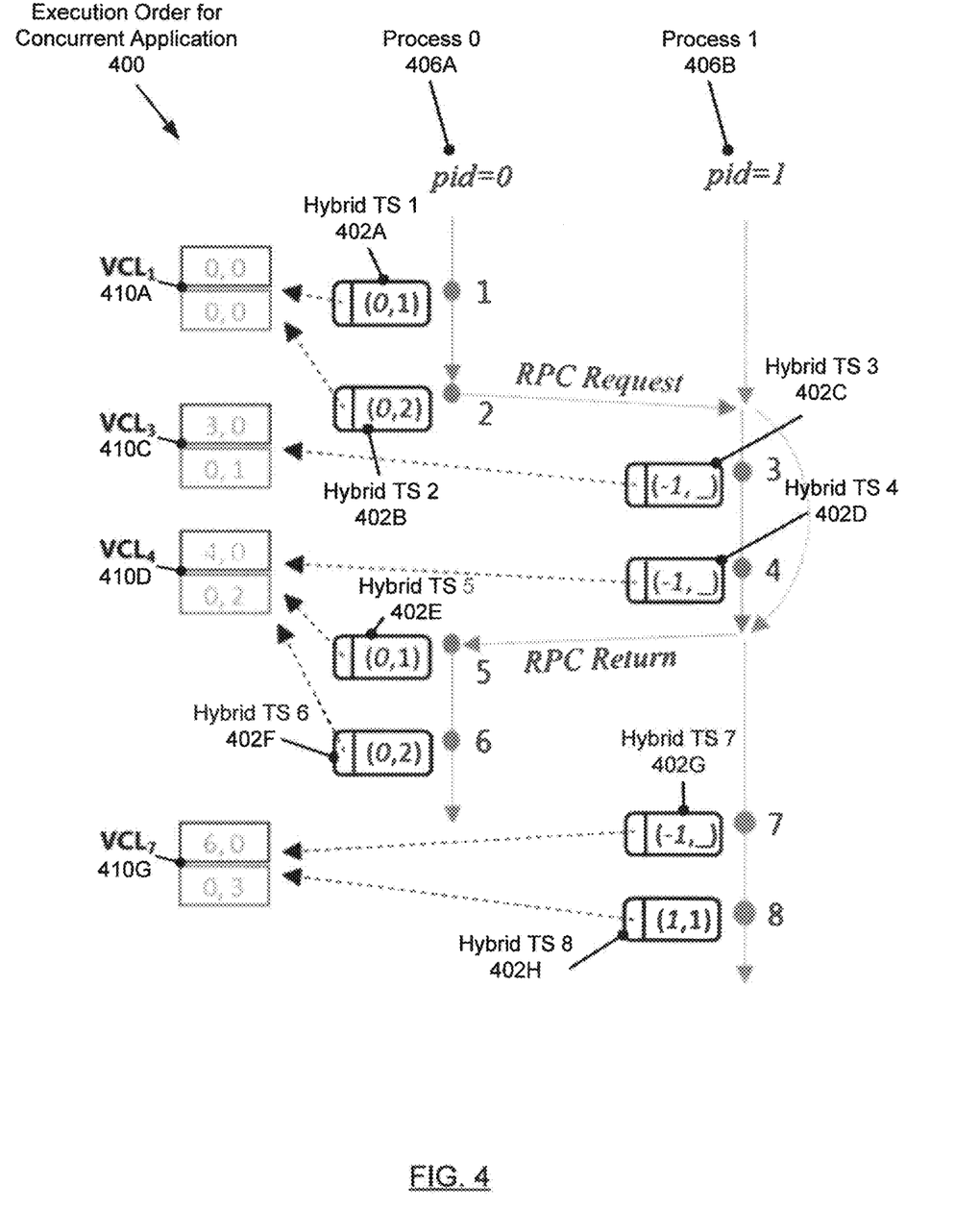
FIG. 4 shows an example in accordance with one or more embodiments of the invention.

The following example is for explanatory purposes only and not intended to limit the scope of the invention. FIG. 4 shows an implementation example in accordance with one or more embodiments of the invention. FIG. 4 illustrates the generation of timestamps for operations having different synchronization categories. FIG. 4 shows a series of operations performed by 2 processes (406A, 406B) of a concurrent application ((108) in FIG. 1A). FIG. 4 shows one possible execution order (400) for the operations performed by the 2 processes (406A, 406B). In this non-limiting example, the execution order (400) is one of several execution orders explored by the model checker ((106) in FIG. 1A) during a dynamic partial order reduction analysis of the concurrent application (108).

FIG. 4 shows a series of 8 hybrid timestamps (402A, 402B, 402C, 402D, 402E, 402F, 402G, 402H) generated by the timestamp generator ((106) in FIG. 1A) for the operations in the execution order (400). Each hybrid timestamp is either a vector list timestamp or a differential timestamp. Operation 2 is a remote procedure call (RPC) request, and operation 5 is the corresponding RPC return. Operation 3 and operation 4 are executed by the remote process 1 (406B) inside the body of a remote procedure call (RPC).

As shown in FIG. 4, the timestamp generator (106) generates vector list timestamp 1 ($VCL_1$) (410A), which is the initial timestamp for the entire concurrent application (108). Vector list timestamp 1 ($VCL_1$) (410A) includes a list of 2 vector clocks, each corresponding to a local view of the logical time for each process (406A, 406B). The first vector clock (i.e., the upper row of $VCL_1$ (410A)) includes a vector of clock values that represent, from the perspective of process 0 (406A), the logical time associated with each process (406A, 406B). Similarly, the second vector clock (i.e., the lower row of $VCL_1$ (410A)) includes clock values that represent, from the perspective of process 1 (406B), the logical time associated with each process (406A, 406B). All the clock values in vector list timestamp 1 ($VCL_1$) (410A) are set to zero. As shown in FIG. 4, vector list timestamp 1 ($VCL_1$) (410A) may be notationally represented as the following list of vector clocks: <[0,0],[0,0]>.

Next, the timestamp generator (106) generates hybrid timestamp 1 (402A) for operation 1, as shown in FIG. 4. A differential timestamp is sufficient because operation 1 does not require synchronization with any other process. Hybrid timestamp 1 (402A) includes a reference to vector list timestamp 1 ($VCL_1$) (410A), and a differential clock value of "1" that represents the logical time for process 0 (406A) after operation 1 is executed. The full vector list timestamp implied by hybrid timestamp 1 (402A) may be represented as the following list of vector clocks: <[1,0],[0,0]>, since the clock value for process 0 (406A) has now been incremented by the differential clock value of "1".

The timestamp generator (106) then generates hybrid timestamp 2 (402B) for operation 2, the RPC request. A differential timestamp is again sufficient because operation 2 does not require synchronization with any other process. Hybrid timestamp 2 (402B) includes a reference to vector list timestamp 1 ($VCL_1$) (410A), and an updated differential clock value of "2" that represents the logical time for process 0 (406A) after operation 2 is executed. In this example, hybrid timestamp 2 (402B) represents the cumulative adjustment to the clock value due to executing both operation 1 and operation 2. The full vector list timestamp implied by hybrid timestamp 2 (402B) may be represented as the following list of vector clocks: <[2,0],[0,0]>.

Next, the timestamp generator (106) generates hybrid timestamp 3 (402C) for operation 3. The synchronization category corresponding to operation 3 is "inside RPC" (i.e., since operation 2 initiated an RPC request), indicating a need for synchronization between multiple processes. Therefore, the timestamp generator (106) does not generate a differential timestamp for operation 3, but instead generates a new vector list timestamp 3 ($VCL_3$) (410C) for operation 3. First, the timestamp generator (106) merges (e.g., decompresses) hybrid timestamp 1 (402A) and hybrid timestamp 2 (402B) (i.e., the differential timestamps corresponding to operation 1 and operation 2) into vector list timestamp 1 (VCL$_1$) (410A), and then initializes vector list timestamp 3 (VCL$_3$) (410C) to the result. Then, the timestamp generator (106) sets hybrid timestamp 3 (402C) to vector list timestamp 3 (VCL$_3$) (410C).

As an implementation optimization, hybrid timestamp 3 (402C) is represented as if it were a differential timestamp, as shown in FIG. 4. That is, when the process identifier field of a differential timestamp contains a special process identifier, in this case −1, the corresponding hybrid timestamp is interpreted as a vector list timestamp (i.e., the vector list timestamp referenced in the first field of the differential timestamp). In this manner, a uniform data structure (i.e., the differential timestamp) may be used to represent any hybrid timestamp.

Next, the timestamp generator (106) increments the clock values of vector list timestamp 3 (VCL$_3$) (410C) to represent the passage of logical time in both the calling process 0 (406A) and the remote process 1 (406B). The first vector clock (i.e., the upper row of VCL$_3$ (410C)), which represents the perspective of process 0 (406A), is adjusted to increment the logical time corresponding to process 0 (406A). Incrementing the logical time corresponding to process 0 (406A) may be represented as adjusting the first vector clock from [2,0] to [3,0], since the first clock value of the first vector clock corresponds to the passage of logical time in process 0 (406A). Note that the second clock value of the first vector clock, which corresponds to the passage of logical time in process 1 (406B), is not updated, since process 0 (406A) has not received any update regarding the additional passage of logical time in the remote process 1 (406B). Similarly, the second vector clock (i.e., the lower row of VCL$_3$ (410C)), which represents the perspective of process 1 (406B), is adjusted to increment the logical time corresponding to process 1 (406B). Incrementing the logical time corresponding to process 1 (406B) may be represented as adjusting the second vector clock from [0,0] to [0,1], since the second clock value of the second vector clock corresponds to the passage of logical time in process 1 (406B). Note that the first clock value of the second vector clock, which corresponds to the passage of logical time in process 0 (406A), is not updated, since process 1 (406B) has not received any update regarding the additional passage of logical time in the calling process 0 (406A). Thus, vector list timestamp 3 (VCL$_3$) (410C) may be represented as: <[3,0],[0,1]> after the clock values for process 0 (406A) and process 1 (406B) have been incremented.

Next, the timestamp generator (106) generates hybrid timestamp 4 (402D) for operation 4. The synchronization category for operation 4 is again "inside RPC", indicating a need for synchronization between multiple processes. The timestamp generator (106) initializes a new vector list timestamp 4 (VCL$_4$) (410D) to vector list timestamp 3 (VCL$_3$) (410C), which was generated above for operation 3. As described above, vector list timestamp 3 (VCL$_3$) (410C) may be represented as: <[3,0],[0,1]>. The timestamp generator (106) then increments the clock values of the vector list timestamp 4 (VCL$_4$) (410D) to represent the passage of logical time in both the calling process 0 (406A) and the remote process 1 (406B). The first vector clock (i.e., the upper row of VCL$_4$ (410D)), which represents the perspective of process 0 (406A), is adjusted to increment the logical time corresponding to process 0 (406A). Incrementing the logical time corresponding to process 0 (406A) may be represented as adjusting the first vector clock from [3,0] to [4,0]. Similarly, the second vector clock (i.e., the lower row of VCL$_4$ (410D)), which represents the perspective of process 1 (406B), is adjusted to increment the logical time corresponding to process 1 (406B). Incrementing the logical time corresponding to process 1 (406B) may be represented as adjusting the second vector clock from [0, 1] to [0,2]. Thus, vector list timestamp 4 (VCL$_4$) (410D) may be represented as: <[4,0],[0,2]>, after the clock values for process 0 (406A) and process 1 (406B) have been incremented.

Operation 5 is an RPC return, which suspends execution in process 1 (406B). Therefore, both operation 5 and operation 6 are executed within process 0 (406A), and do not require inter-process synchronization. The timestamp generator (106) next generates hybrid timestamp 5 (402E) and hybrid timestamp 6 (402F) as differential timestamps for operation 5 and operation 6, respectively, relative to the previously generated full vector list timestamp 4 (VCL$_4$) (410D), represented as <[4,0],[0,2]>. The full vector list timestamp implied by hybrid timestamp 5 (402E) may be represented as: <[5,0],[0,2]>, since the clock value for process 0 (406A) is incremented to account for the execution of operation 5. Similarly, the full vector list timestamp implied by hybrid timestamp 6 (402F) may be represented as: <[6,0],[0,2]>.

Next, the timestamp generator (106) generates hybrid timestamp 7 (402G) for operation 7. Operation 7 is executed by process 1 (406A), representing a context switch from process 0 (406A) to process 1 (406B). The synchronization category corresponding to operation 7 is "context switch", indicating a need for synchronization between multiple processes. Therefore, the timestamp generator (106) generates a new vector list timestamp 7 (VCL$_7$) (410G) for operation 7.

First, the timestamp generator (106) merges hybrid timestamp 5 (402E) and hybrid timestamp 6 (402F) into vector list timestamp 4 (VCL$_4$) (410D), which is referenced by hybrid timestamp 5 (402E) and hybrid timestamp 6 (402F), and then initializes vector list timestamp 7 (VCL$_7$) (410G) to the result. As described above, the full (e.g., decompressed) vector list timestamp that incorporates hybrid timestamp 5 (402E) and hybrid timestamp 6 (402F) is represented as <[6,0],[0,2]>.

Next, the timestamp generator (106) adjusts the appropriate clock value of the vector list timestamp 7 (VCL$_7$) (410G) to represent the passage of logical time in process 1 (406B). The second vector clock (i.e., the lower row of VCL$_7$ (410G)), which represents the perspective of process 1 (406B), is adjusted to increment the logical time corresponding to process 1 (406B). Incrementing the logical time corresponding to process 1 (406B) may be represented as adjusting the second vector clock from [0,2] to [0,3], since the second clock value of the second vector clock corresponds to the passage of logical time in process 1 (406B). Thus, vector list timestamp 7 (VCL$_7$) (410G) may be represented as <[6,0],[0,3]>, after the clock value for process 1 (406B) has been incremented.

Next, the timestamp generator (106) generates hybrid timestamp 8 (402H) for operation 8. A differential timestamp is sufficient because operation 8 does not require synchronization with any other process. Hybrid timestamp 8 (402H) includes a reference to vector list timestamp 7 (VCL$_7$) (410G), and a differential clock value of "1" for process 1 (406B), the process executing operation 8. The full vector list timestamp implied by hybrid timestamp 8 (402H) may be represented as: <[6,0],[0,4]>, since the clock value for process 1 (406B) is again been incremented to represent the passage of logical time in process 1 (406B).

The model checker (104) then uses the various hybrid timestamps (402A, 402B, 402C, 402D, 402E, 402F, 402G, 402H) to determine whether a happens-before relation exists between operations in process 0 (406A) and process 1 (406B). The happens-before relation may be determined by comparing the vector clocks corresponding to the operations (e.g., by pair-wise comparing the clock values in the vector clocks). For example, the vector clock implied by hybrid timestamp 2 (402B), corresponding to operation 2 in process 0 (406A) may be represented as [2,0], while the vector clock of hybrid timestamp 7 (402G) corresponding to operation 7 in process 1 (406B) may be represented as [0,3]. The vector clock implied by hybrid timestamp 2 (402B) has a clock value of 2 for process 0 (406A), which is greater than the corresponding clock value of 0 in the vector clock of vector list timestamp 7 ($VCL_7$) (410G). However, the vector clock implied by hybrid timestamp 2 (402B) has a clock value of 0 for process 1 (406B), which is less than the corresponding clock value of 3 in the vector clock of vector list timestamp 7 ($VCL_7$) (410G). Therefore, there is no happens-before relation between operation 2 and operation 7, since any potential happens-before relation would be manifested in each execution order. Thus, operation 7 may be rescheduled to execute before operation 2 if the model checker (104) detects a conflict between operation 2 and operation 7.

In the above example, only four full vector list timestamps (410A, 410C, 410D, 410G) were generated for 8 operations. As discussed above, to the extent that the requirement for inter-process synchronization is rare (e.g., when the next operation typically follows the previous operation in the same process), more differential timestamps and fewer full vector list timestamps need to be generated, thereby reducing memory consumption.

Figures 5A, 5B:
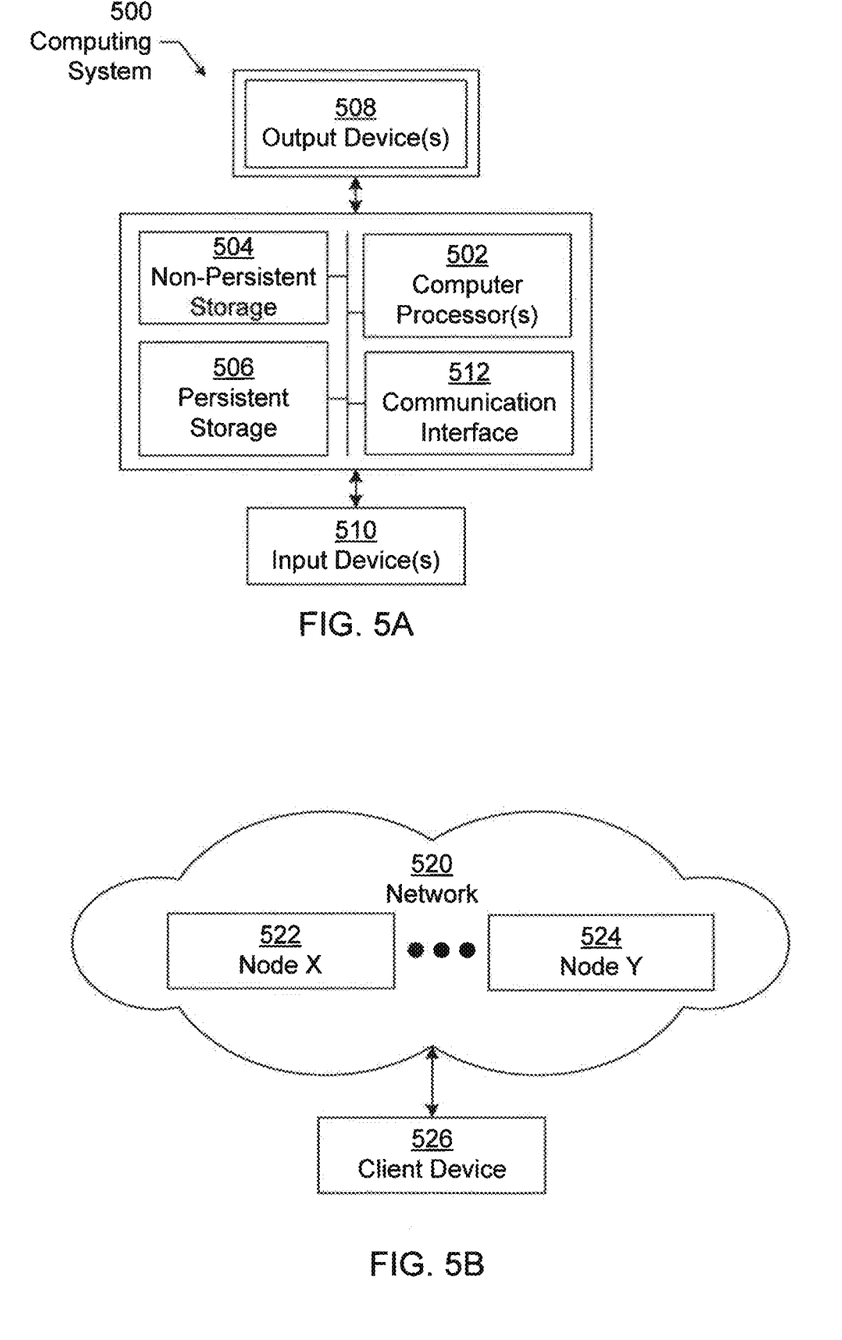
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   obtaining a concurrent application comprising a plurality of processes, each comprising a plurality of operations;
   obtaining an initial hybrid timestamp for an initial operation of a first process of the plurality of processes, wherein the initial hybrid timestamp comprises an initial vector list timestamp comprising an initial plurality of vector clocks each comprising a clock value for each of the plurality of processes;
   determining, by a processor, a first synchronization category for a next operation of the first process; and
   in response to the first synchronization category indicating that the next operation does not require inter-process synchronization, generating a next hybrid timestamp for the next operation, wherein the next hybrid timestamp comprises a differential timestamp relative to the initial hybrid timestamp.

2. The method of claim 1, further comprising:
   decompressing the next hybrid timestamp by generating a next vector list timestamp obtained by merging the differential timestamp into to the initial hybrid timestamp.

3. The method of claim 2,
   wherein the next vector list timestamp comprises a next plurality of vector clocks each comprising a clock value for each of the plurality of processes, the next plurality of vector clocks comprising a first vector clock comprising a first clock value for the first process,
   wherein the differential timestamp comprises a differential clock value for the first process, and
   wherein merging the differential timestamp into to the initial hybrid timestamp comprises obtaining an updated clock value using the differential clock value and the first clock value.

4. The method of claim 3, further comprising:
   obtaining another hybrid timestamp for a potentially conflicting operation of a second process of the plurality of processes; and
   determining a happens-before relation between the next operation and the potentially conflicting operation by comparing the next vector list timestamp and the another hybrid timestamp.

5. The method of claim 4,
wherein the another hybrid timestamp comprises another vector list timestamp comprising another plurality of vector clocks each comprising a clock value for each of the plurality of processes, the another plurality of vector clocks comprising a second vector clock comprising a second clock value for the second process, and
wherein comparing the next hybrid timestamp and the another hybrid timestamp comprises comparing the updated clock value and the second clock value.

6. The method of claim 4, further comprising:
applying a dynamic partial order reduction analysis to the concurrent application using the happens-before relation.

7. The method of claim 1, further comprising:
determining a second synchronization category for another operation of the first process; and
in response to the second synchronization category indicating that the another operation is synchronized with a second process of the plurality of processes, generating another hybrid timestamp for the another operation comprising another vector list timestamp.

8. The method of claim 7,
wherein the another vector list timestamp comprises another plurality of vector clocks each comprising a clock value for each of the plurality of processes, the another plurality of vector clocks comprising a second vector clock comprising a second clock value for the second process,
wherein the method further comprises:
in response to the second synchronization category indicating that the another operation is synchronized with the second process, updating the second clock value for the second process.

9. A system, comprising:
a memory, coupled to a processor, comprising a repository comprising:
a concurrent application comprising a plurality of processes, each comprising a plurality of operations,
an initial hybrid timestamp for an initial operation of a first process of the plurality of processes, wherein the initial hybrid timestamp comprises an initial vector list timestamp comprising an initial plurality of vector clocks each comprising a clock value for each of the plurality of processes, and
a next hybrid timestamp for a next operation of the first process, wherein the next hybrid timestamp comprises a differential timestamp relative to the initial hybrid timestamp; and
a timestamp generator executing on the processor configured to:
determine a first synchronization category for the next operation; and
in response to the first synchronization category indicating that the next operation does not require inter-process synchronization, generate the next hybrid timestamp.

10. The system of claim 9, wherein the timestamp generator is further configured to:
decompress the next hybrid timestamp by generating a next vector list timestamp obtained by merging the differential timestamp into to the initial hybrid timestamp.

11. The system of claim 10,
wherein the next vector list timestamp comprises a next plurality of vector clocks each comprising a clock value for each of the plurality of processes, the next plurality of vector clocks comprising a first vector clock comprising a first clock value for the first process,
wherein the differential timestamp comprises a differential clock value for the first process, and
wherein merging the differential timestamp into to the initial hybrid timestamp comprises obtaining an updated clock value using the differential clock value and the first clock value.

12. The system of claim 11, wherein the timestamp generator is further configured to:
obtain another hybrid timestamp for a potentially conflicting operation of a second process of the plurality of processes; and
determine a happens-before relation between the next operation and the potentially conflicting operation by comparing the next vector list timestamp and the another hybrid timestamp.

13. The system of claim 12,
wherein the another hybrid timestamp comprises another vector list timestamp comprising another plurality of vector clocks each comprising a clock value for each of the plurality of processes, the another plurality of vector clocks comprising a second vector clock comprising a second clock value for the second process, and
wherein comparing the next hybrid timestamp and the another hybrid timestamp comprises comparing the updated clock value and the second clock value.

14. The system of claim 12, further comprising a model checker configured to:
apply a dynamic partial order reduction analysis to the concurrent application using the happens-before relation.

15. The system of claim 9, wherein the timestamp generator is further configured to:
determine a second synchronization category for another operation of the first process; and
in response to the second synchronization category indicating that the another operation is synchronized with a second process of the plurality of processes:
generate another hybrid timestamp for the another operation comprising another vector list timestamp comprising another plurality of vector clocks each comprising a clock value for each of the plurality of processes, the another plurality of vector clocks comprising a second vector clock comprising a second clock value for the second process; and
update the second clock value for the second process.

16. A non-transitory computer readable medium comprising instructions that, when executed by a processor, perform:
obtaining a concurrent application comprising a plurality of processes, each comprising a plurality of operations;
obtaining an initial hybrid timestamp for an initial operation of a first process of the plurality of processes, wherein the initial hybrid timestamp comprises an initial vector list timestamp comprising an initial plurality of vector clocks each comprising a clock value for each of the plurality of processes;
determining a first synchronization category for a next operation of the first process; and
in response to the first synchronization category indicating that the next operation does not require inter-process synchronization, generating a next hybrid timestamp for the next operation, wherein the next hybrid timestamp comprises a differential timestamp relative to the initial hybrid timestamp.

17. The non-transitory computer readable medium of claim 16, further comprising instructions that perform:

decompressing the next hybrid timestamp by generating a next vector list timestamp obtained by merging the differential timestamp into to the initial hybrid timestamp.

18. The non-transitory computer readable medium of claim 17,
wherein the next vector list timestamp comprises a next plurality of vector clocks each comprising a clock value for each of the plurality of processes, the next plurality of vector clocks comprising a first vector clock comprising a first clock value for the first process,
wherein the differential timestamp comprises a differential clock value for the first process, and
wherein merging the differential timestamp into to the initial hybrid timestamp comprises obtaining an updated clock value using the differential clock value and the first clock value.

19. The non-transitory computer readable medium of claim 18, further comprising instructions that perform:
obtaining another hybrid timestamp for a potentially conflicting operation of a second process of the plurality of processes; and
determining a happens-before relation between the next operation and the potentially conflicting operation by comparing the next vector list timestamp and the another hybrid timestamp.

20. The non-transitory computer readable medium of claim 18, further comprising instructions that perform:
applying a dynamic partial order reduction analysis to the concurrent application using the happens-before relation.

* * * * *

UNITED STATES PATENT AND TRADEMARK OFFICE
CERTIFICATE OF CORRECTION

PATENT NO. : 10,620,660 B2  
APPLICATION NO. : 15/935190  
DATED : April 14, 2020  
INVENTOR(S) : Yang Zhao et al.

Page 1 of 1

It is certified that error appears in the above-identified patent and that said Letters Patent is hereby corrected as shown below:

In the Claims

Claim 2, Column 16, Line 46, the word "to", between the words "into" and "the", should be removed.

Claim 3, Column 16, Line 56, the word "to", between the words "into" and "the", should be removed.

Claim 10, Column 17, Line 62, the word "to", between the words "into" and "the", should be removed.

Claim 11, Column 18, Line 5, the word "to", between the words "into" and "the", should be removed.

Claim 17, Column 19, Line 3, the word "to", between the words "into" and "the", should be removed.

Claim 18, Column 19, Line 14, the word "to", between the words "into" and "the", should be removed.

Signed and Sealed this  
Fourteenth Day of July, 2020

Andrei Iancu  
*Director of the United States Patent and Trademark Office*